G. H. TREADGOLD.
TANK GAGE.
APPLICATION FILED JULY 25, 1912.
1,065,283.
Patented June 17, 1913.
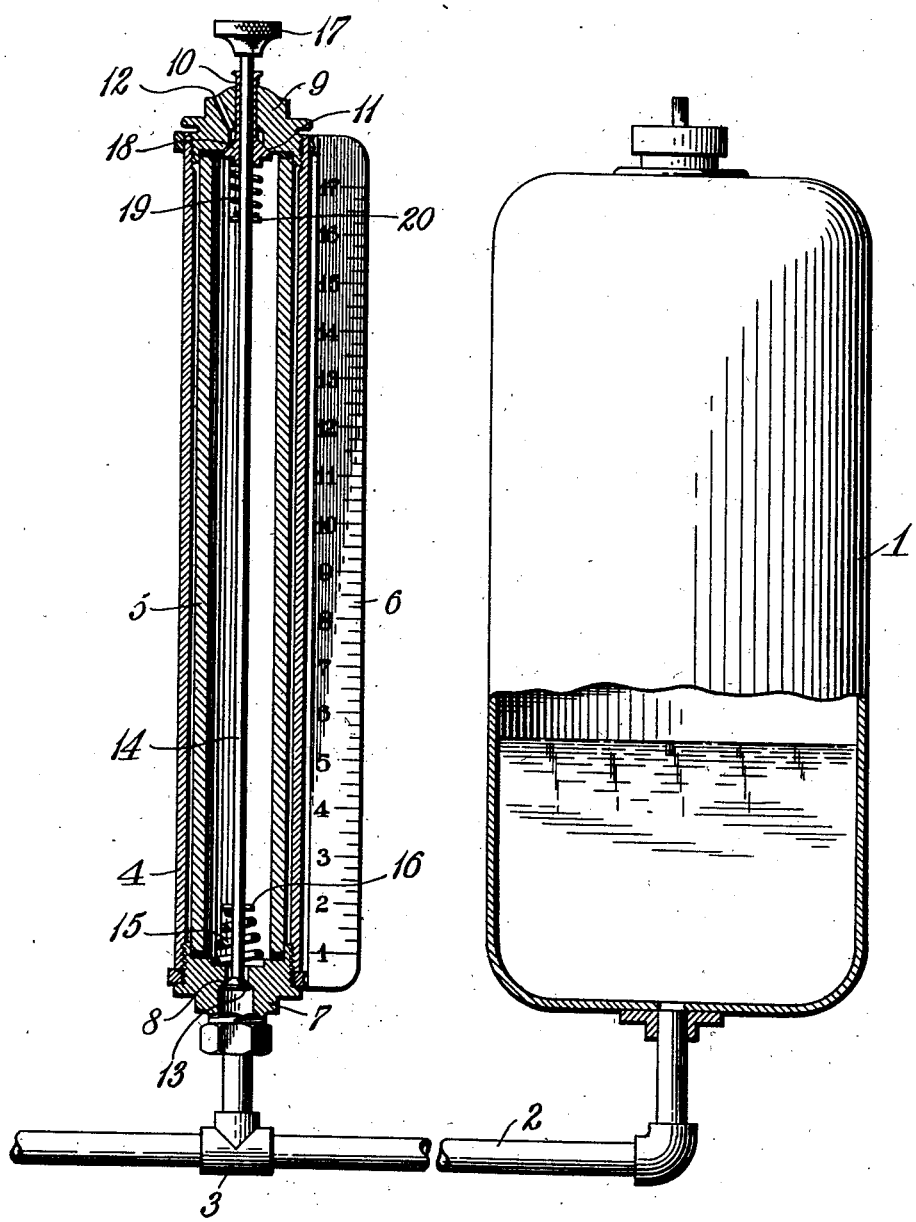
Witnesses
Chas. W. Stauffiger
Anna M. Dorr
Inventor
George H. Treadgold,
By
Attorneys

UNITED STATES PATENT OFFICE.

GEORGE H. TREADGOLD, OF PORT HURON, MICHIGAN.

TANK-GAGE.

1,065,283.  
Specification of Letters Patent.  
Patented June 17, 1913.

Application filed July 25, 1912. Serial No. 711,454.

*To all whom it may concern:*

Be it known that I, GEORGE H. TREADGOLD, a citizen of the United States of America, residing at Port Huron, in the county of St. Clair and State of Michigan, have invented certain new and useful Improvements in Tank-Gages, of which the following is a specification, reference being had therein to the accompanying drawings.

This invention relates to a tank gage for automobiles and more especially to an arrangement thereof whereby any accidental leakage from the tank because of breaking of the gage or the like is avoided and whereby all danger of ignition of the gage contents is likewise obviated.

The invention consists in the matters hereinafter set forth and more particularly pointed out in the appended claims.

In the drawing the figure is a view partially in elevation and partially in section of a gage that embodies features of the invention.

As herein shown in preferred form the supply tank 1 of an automobile has a pipe 2 leading therefrom for supplying the carbureter. Between the carbureter and the tank a suitable fitting such as a T compression coupling 3 is inserted in the pipe with its branch connected through proper couplings with the lower end of a gage glass frame 4. The latter carries a gage tube or glass 5 in parallel relation to an indicating scale 6. Preferably, the casing holds the glass by means of two bushings screwed or otherwise secured to its opposite ends with gaskets in compression between the ends of the gage glass and the bushings. The lower bushing 7 is centrally apertured with an annular valve seat 8 near its upper end. The upper bushing or cap 9 has a central guide aperture in which a sleeve 10 is longitudinally reciprocable. The bushing also has an annular valve seat 11 at its lower end into the face of which a vent passage 12 opens from the exterior of the cap.

A closure 13 adapted to seal the seat 8, is carried by a stem 14 that is reciprocable through the gage tube 5 and through the sleeve 10. A spring 15 in compression between the bushing 7 and a stop collar 16 on the stem normally holds the closure 13 to seat and at the same time projects a head 17 on the upper end of the stem a sufficient distance from the sleeve 10 so as not to move the latter. A closure 18 that is slidable on the stem 14 is normally held against the seat 11 by a spring 19 on the stem in compression between the closure and a suitable stop 20 on the stem.

The gage is mounted in any suitable position on an automobile or other support in convenient view of the user and is connected with the tank to be gaged on the same level as the tank. Whenever the operator wishes to find the level of the tank he depresses the stem thereby simultaneously opening the lower valve and the air vent and allowing the contents of the tank to flow into the gage glass. When he releases the valve stem the lower valve closes and the air vent is stopped. This effectively seals the gage glass from leakage. If, however, the glass is broken its contents only can escape without affecting the pipe leading to the carbureter. Because of this construction the gage is safe and may be used in place where the ordinary water gage is not available.

Obviously changes in the details of construction may be made without departing from the spirit of my invention and I do not care to limit myself to any particular form or arrangement of parts.

What I claim is:—

1. The combination with a tank and a discharge pipe therefrom, of a gage glass in operative relation to the tank and in communication with the pipe, provided with an air vent, and manually operable means controlling both the vent and communication between the glass and pipe adapted to normally shut off communication and to close the vent.

2. The combination with a tank and a discharge pipe therefrom, of a gage glass in operative relation to the tank and in communication with the pipe having an air vent, a valve closure controlling the flow between the pipe and glass, a valve closure controlling the vent, and means for simultaneously moving both to open position.

3. The combination with a tank and a discharge pipe therefrom, of a gage glass in operative relation to the tank and in communication with the pipe having an air vent, means normally closing the vent and cutting off such communication, and means for manually moving said means to open position.

4. The combination with a tank and a discharge pipe therefrom, of a gage glass in operative relation to the tank and in communication with the pipe provided with an air vent, a normally closed valve controlling communication between the pipe and glass, a normally closed valve controlling the air vent from the glass, and manually operable means for simultaneously opening both valves.

5. The combination with a tank and a discharge pipe therefrom, of a frame, a gage glass, bushings with apertured valve seats clamping the glass in the frame, a sleeve reciprocable in the upper bushing, a stem reciprocable in the sleeve and lower bushing, a closure on the stem for the lower seat, the upper bushing having an air vent, a closure reciprocable on the stem adapted to seal an air vent through the upper bushing into the glass, a spring holding the stem projected and the lower closure seated, a spring for projecting the upper closure to seat, a head on the stem adapted to operate the sleeve to unseat the upper closure when the stem is depressed and fittings connecting the pipe with the glass through the lower bushing.

In testimony whereof I affix my signature in presence of two witnesses.

GEORGE H. TREADGOLD.

Witnesses:
HERMAN J. HILL,
F. C. STRINGER.